United States Patent
Jeon et al.

(10) Patent No.: US 7,621,013 B2
(45) Date of Patent: Nov. 24, 2009

(54) METHOD OF WASHING LAUNDRY IN DRUM WASHING MACHINE

(75) Inventors: Si-Moon Jeon, Seoul (KR); Na-Eun Kim, Seoul (KR); Kyung-Chul Woo, Seoul (KR)

(73) Assignee: LG Electronics Inc., Seoul (KR)

( * ) Notice: Subject to any disclaimer, the term of this patent is extended or adjusted under 35 U.S.C. 154(b) by 746 days.

(21) Appl. No.: 11/181,801

(22) Filed: Jul. 15, 2005

(65) Prior Publication Data

US 2006/0010613 A1  Jan. 19, 2006

(30) Foreign Application Priority Data

Jul. 19, 2004  (KR) .................... 10-2004-0056031

(51) Int. Cl.
*D06F 39/04*  (2006.01)

(52) U.S. Cl. ............................. 8/159; 68/15

(58) Field of Classification Search ............. 68/15, 68/24, 58, 140; 134/184, 198
See application file for complete search history.

(56) References Cited

U.S. PATENT DOCUMENTS

| | | | | |
|---|---|---|---|---|
| 1,376,227 A | * | 4/1921 | Rabezzana | 68/151 |
| 1,558,733 A | * | 10/1925 | Lippard | 68/140 |
| 2,030,394 A | * | 2/1936 | Pierce | 8/137 |
| 2,289,515 A | * | 7/1942 | Mathews | 68/58 |
| 2,302,923 A | * | 11/1942 | Zimarik | 137/387 |
| 2,326,067 A | * | 8/1943 | Rohr | 68/139 |
| 2,404,450 A | * | 7/1946 | Meyer | 68/58 |
| 2,438,597 A | * | 3/1948 | Batina | 68/142 |
| 2,438,737 A | * | 3/1948 | Batina | 68/143 |
| 2,612,035 A | * | 9/1952 | Buss et al. | 68/12.05 |
| RE23,727 E | * | 10/1953 | Miller | 68/139 |
| 2,706,899 A | * | 4/1955 | Meyer | 68/23.5 |
| 3,402,570 A | * | 9/1968 | Schlichtig | 62/483 |
| 3,740,975 A | * | 6/1973 | Cornelius | 68/18 F |
| 3,935,719 A | * | 2/1976 | Henderson | 68/58 |
| 4,489,574 A | * | 12/1984 | Spendel | 68/16 |
| 4,941,333 A | * | 7/1990 | Blessing | 68/19.2 |
| 5,758,377 A | | 6/1998 | Cimetta et al. | |
| 6,557,383 B1 | * | 5/2003 | Ito et al. | 68/23.2 |
| 2003/0061842 A1 | * | 4/2003 | Ryu et al. | 68/17 R |

(Continued)

FOREIGN PATENT DOCUMENTS

CN  1509357 A  6/2001

(Continued)

OTHER PUBLICATIONS

European Patent Office 0 816 550 Jan. 1998.*

(Continued)

*Primary Examiner*—Frankie L Stinson
(74) *Attorney, Agent, or Firm*—Birch, Stewart, Kolasch & Birch, LLP (57) ABSTRACT

Disclosed is a method of washing laundry in a drum washing machine by which the amount of wash water used and the amount of power use can be decreased when doing washing in the drum washing machine. The method comprises supplying wash water to a tub up to a first preset water level; and washing laundry in a drum by rotating the drum of the drum washing machine forward and backward simultaneously while drawing the wash water and supplying the drawn wash water to the drum.

26 Claims, 5 Drawing Sheets

U.S. PATENT DOCUMENTS

2004/0244438 A1 12/2004 North
2005/0034488 A1 2/2005 Oh et al.
2005/0217036 A1 10/2005 Park

FOREIGN PATENT DOCUMENTS

| | | |
|---|---|---|
| CN | 1465774 A | 1/2004 |
| EP | 0778367 | 6/1997 |
| EP | 0816550 | 1/1998 |
| EP | 1087051 | 3/2001 |
| EP | 1507030 | 2/2005 |
| GB | 1174815 | 12/1969 |
| JP | 4-158896 * | 6/1992 |
| JP | 2003-93775 | 4/2003 |
| WO | 03/012185 | 2/2003 |

OTHER PUBLICATIONS

European Patent Office 0 816 550 Jan. 7, 1997.*
English language Abstract of JP 2003-93775.
English language Abstract of CN 1465774 A.
English language Abstract of WO 03/080916.

* cited by examiner

METHOD OF WASHING LAUNDRY IN DRUM WASHING MACHINE

BACKGROUND OF THE INVENTION

1. Field of the Invention

The present invention relates to a method of washing laundry in a drum washing machine, and more particularly, to a method of washing laundry in a drum washing machine by which the amount of wash water used and the amount of power use can be reduced when doing washing.

2. Description of the Background Art

Generally, a washing machine is a machine designed to clean laundry by carrying out the steps of washing, rinsing and dewatering. According to a washing method, washing machines are classified into pulsator type machines, agitation type machines, drum type machines, and so on. Hereinafter, a general drum washing machine according to the prior art will be described with reference to FIG. 1.

Figure 1:
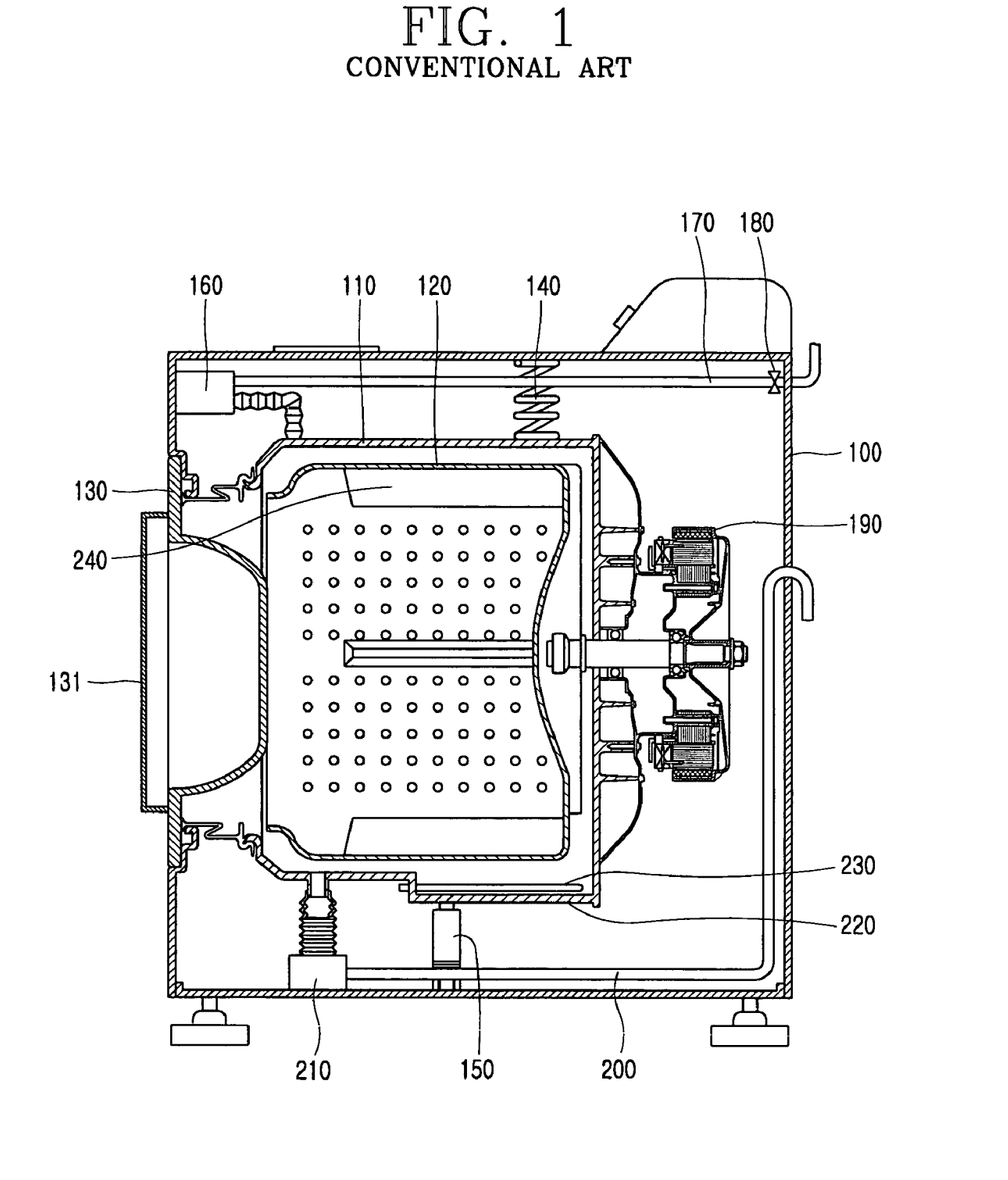
FIG. 1 is a cross sectional view showing the construction of a drum washing machine according to the prior art.

FIG. 1 is a cross sectional view showing the construction of a drum washing machine according to the prior art.

As illustrated therein, the drum washing machine according to the prior art comprises: a cabinet 100 forming the appearance of the drum washing machine; a tub 110 arranged in the cabinet 100 for storing wash water; and a rotatable drum 120 arranged in the tub 110 for washing and dewatering laundry.

Hereinafter, the construction of the drum washing machine according to the prior art will be described in detail.

First, an inlet 130 for letting laundry enter and exit is formed on the front surface of the cabinet 100, and a door 135 for opening and closing the inlet 130 is disposed in front of the inlet 130. Further, the tub 110 is disposed in an anteroposterior direction in the cabinet 100. A plurality of support springs 140 and a plurality of dampers 150 are provided in the upper and lower sides of the tub 110 for cushioning and supporting the tub 110.

A detergent supply unit 160 is formed in the upper side of the tub 110 so as to supply detergent. Since the detergent supply unit 160 is connected to the tub 100, it can supply wash water and detergent to the tub 110. Further, a water supply pipe 170 with a water supply valve 180 is connected to one side of the detergent supply unit 160 so as to supply wash water. A drum driving motor 190 is coupled to the rear surface of the tub 110 so as to rotate the drum 120. A drainage channel 200 and a drainage pump 210 for drainage are provided on the bottom surface of the tub 110. A heater room 220 is formed at one lower region of the tub 110. A heater 230 is disposed in the heater room 220 for heating the wash water stored in the tub 110.

Meanwhile, a plurality of lifts 240, projected in the central axis direction of the drum 120 and extended in a direction parallel to the central axis of the drum 120, are formed on the inner surface of the drum 120 so as to move laundry upward and drop the laundry down.

A method of washing laundry in a drum washing machine according to the prior art will be described below. When a user starts the washing operation of the drum washing machine after putting laundry in the drum 120, the water supply valve 180 is opened to supply wash water into the tub 110 along with detergent. Thereafter, when the water level of the wash water reaches a set water level, the heater 230 is operated to heat the wash water, and simultaneously the drum 120 is rotated. Afterwards, when the temperature of the wash water reaches a set temperature, the heater 230 stops its operation and the drum driving motor 190 is operated until a set time, thereby carrying out the washing procedure. Here, when the drum 120 is rotated, the laundry in the drum 120 is moved upward by the lefts 240, and then dropped to a lower portion in the drum 120, thereby implementing the washing operation. Here, the heater 230 improves washing performance by heating the wash water at a temperature set according to the user's selection.

However, in the drum washing machine according to the prior art, as explained above, the heater room 220 is formed in a manner to be projected in a lower portion of the tub 110 in a downward direction so as to heat wash water, and the heater 230 is arrange din the heater room 220 so as to heat the wash water collected in the heater room 220. Thus, there is a problem that the amount of wash water used is increased because wash waster has to be additionally supplied in order to maintain a proper water level such that the heater 230 may be soaked in the wash water.

Furthermore, the drum washing machine according to the prior art has a problem that the amount of power use for heating the wash water is increased since the amount of wash water used is increased due to the aforementioned structure of the heater room 220 and heater 230.

SUMMARY OF THE INVENTION

Therefore, an object of the present invention is to provide a method of washing laundry in a drum washing machine by which the amount of wash water used can be decreased when doing washing.

Another object of the present invention is to provide a method of washing laundry in a drum washing machine by which the amount of power use can be reduced when doing washing.

To achieve the above objects, there is provided a method of washing laundry in a drum washing machine according to one aspect of the present invention, comprising supplying wash water to a tub of the drum washing machine up to a first preset water level; and washing laundry in a drum of the drum washing machine by rotating the drum forward and backward simultaneously while drawing the wash water and supplying the drawn wash water to the drum.

To achieve the above objects, there is provided a method of washing laundry in a drum washing machine according to another aspect of the present invention, the drum washing machine comprising a tub, a drum rotatably disposed in the tub, a circulation channel formed to circulate wash water in the tub and supply the same to laundry, a circulation pump for drawing the wash water and circulating the drawn wash water along the circulation channel, and a steam generator for generating steam and injecting the generated steam into the drum, the method comprising supplying wash water to the tub up to a first preset water level; washing laundry while circulating the wash water along the circulation channel simultaneously while rotating the drum forward and backward; and washing the laundry while circulating the wash water along the circulation channel by generating steam in the steam generator, injecting the generated steam into the drum and rotating the drum forward and backward.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, there will be described a preferred embodiment of a method of washing laundry in a drum washing machine, the drum washing machine comprising a cabinet, a tub stored in the cabinet, a drum rotatably disposed in the tub, a circulation channel for moving wash water in the tub through, a circulation pump for drawing the wash water and circulating the same along the circulation channel, and a steam generator for generating steam and injecting the same into the drum, which can decrease the amount of wash water used of the drum washing machine and reduce the amount of power use thereof by supplying wash water to the tub up to a preset water level, washing laundry while circulating the wash water along the circulation channel simultaneously while rotating the drum forward and backward, and washing the laundry while circulating the wash water along the circulation channel simultaneously while generating steam in the steam generator, injecting the generated steam into the drum and rotating the drum forward and backward. Here, the construction of the present invention equivalent to the prior art construction will be described with reference to the reference numerals of FIG. 1 for the convenience of explanation of the drawings.

Figure 2:
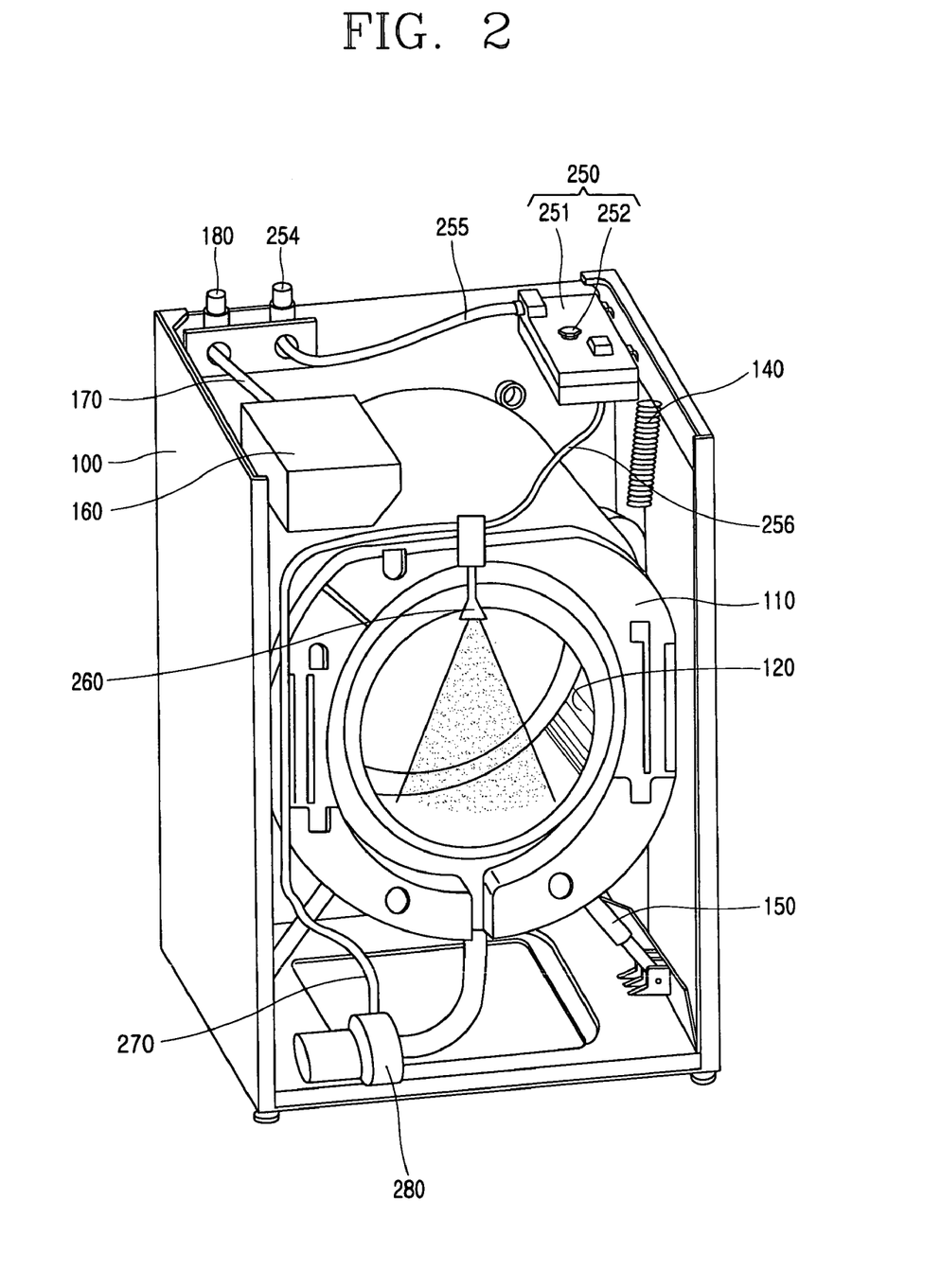
FIG. 2 is a view illustrating the structure of a drum washing machine for embodying a method of washing laundry in a drum washing machine according to an embodiment of the present invention.

FIG. 2 is a view illustrating the structure of a drum washing machine for embodying a method of washing laundry in a drum washing machine according to the embodiment of the present invention.

As illustrated in FIG. 2, the drum washing machine for embodying the method of washing laundry in the drum washing machine comprises a cabinet 100 forming the appearance of the drum washing machine; a tub 110 arranged in the cabinet 100 for storing wash water; a rotatable drum 120 arranged in the tub 110 for washing and dewatering laundry; a detergent supply unit 160 for supplying detergent into the tub 110; a steam generator 250 arranged in the upper side of the tub 110 in the cabinet 100 for generating steam; and an injector 260 for injecting the steam discharged from the steam generator 250 into the tub 110.

The structure of the drum washing machine for embodying the method of washing laundry in the drum washing machine according to the present invention will be described in detail.

One end of a circulation channel 270 is connected to a lower region of the tub 110 so as to draw wash water from inside the tub 110, and the other end of the circulation channel 270 is connected to the injector 260. Further, a circulation pump 280 is provided on the circulation channel 270 so as to draw and return wash water.

The steam generator 250 comprises a case 251 forming a space for storing water for steam generation formed inside, a heater 253 (not shown) coupled to the case 251 so as to heat the water stored in the case 251, and a steam water level sensor 252 for sensing a water level in the case 251. A water supply pipe 255 with a steam water supply valve 254 is connected to one side of the case 251 for supply water, and one end of a steam exhaust channel 256 is connected to the other side thereof for exhausting steam generated by heating by the heater 253. The other end of the steam exhaust channel 256 is connected to the injector 260 such that the steam generated from the steam generator 250 may be injected into the drum 120.

Figure 3:
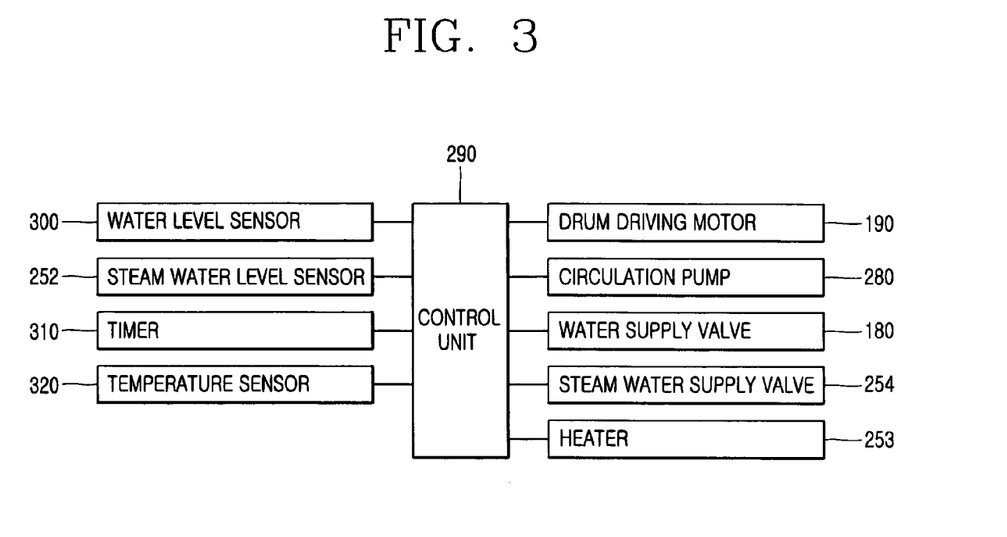
FIG. 3 is a block diagram illustrating the construction of the drum washing machine for embodying the method of washing laundry in the drum washing machine according to the embodiment of the present invention.

FIG. 3 is a block diagram illustrating the construction of the drum washing machine for embodying the method of washing laundry in the drum washing machine according to the embodiment of the present invention.

A water level sensor 300 for sensing a water level of wash water in the tub 110; the steam water level sensor 252 for sensing a water level of steam water from the steam generator 250; a timer 310 for calculating a step-by-step operation time of each washing process; a temperature sensor 320 for detecting a temperature of the wash water in the tub 110; a drum driving motor 190; the circulation pump 280; the water supply valve 180 and the steam water supply valve 254; and the heater 253 for heating steam water are electrically connected, respectively, to a control unit 290 of the drum washing machine embodied in a microcomputer with a control program stored therein in order carry out a washing process step by step. The control unit 290 controls each of the devices.

The embodiment of the method of washing laundry in the drum washing machine according to the present invention constructed of the devices as shown in FIGS. 2 and 3 will be described with reference to FIGS. 4A and 4B.

Figure 4A:
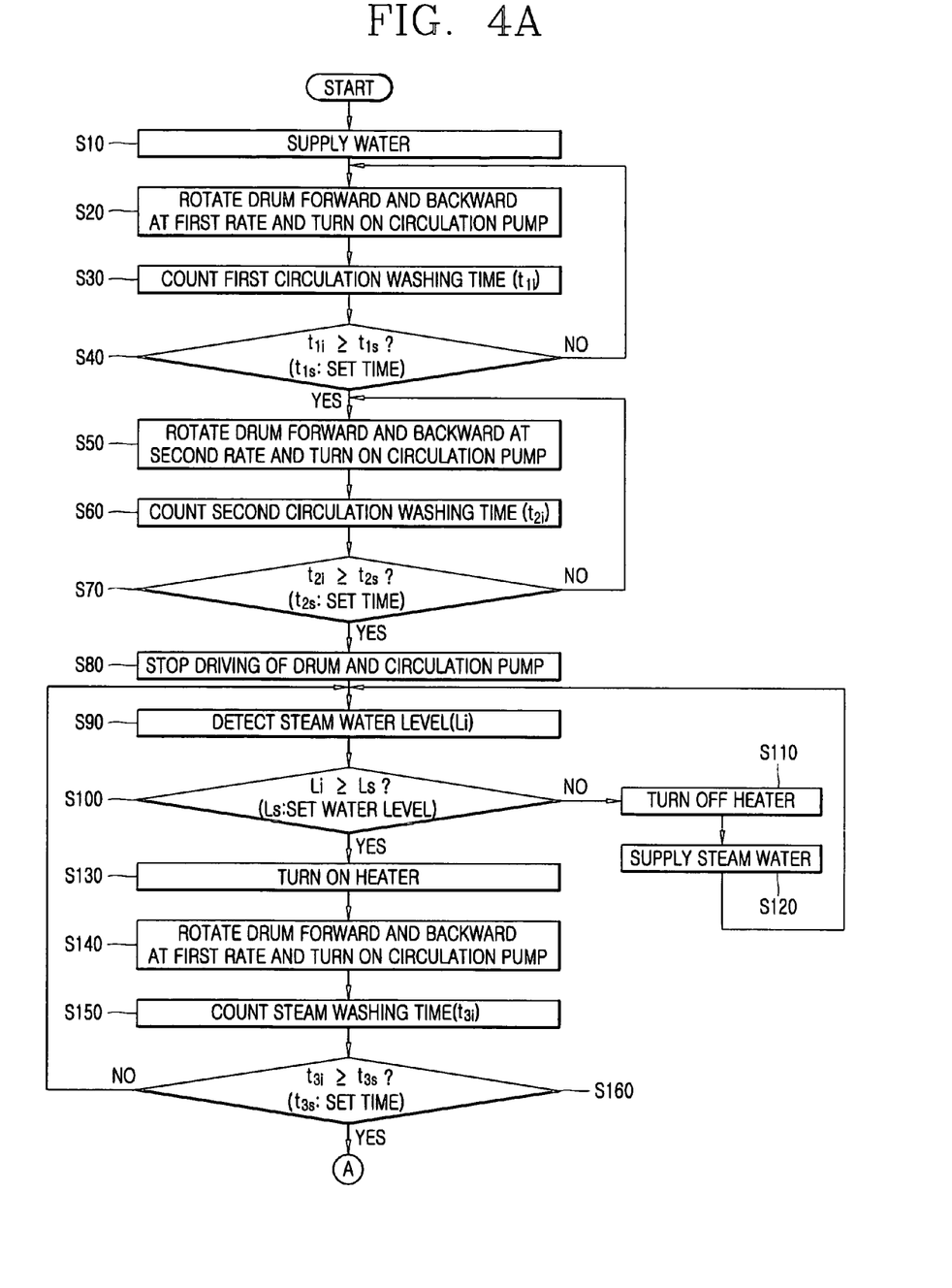
FIGS. 4A and 4B are flow charts for explaining the method of washing laundry in the drum washing machine according to the embodiment of the present invention.
Figure 4B:
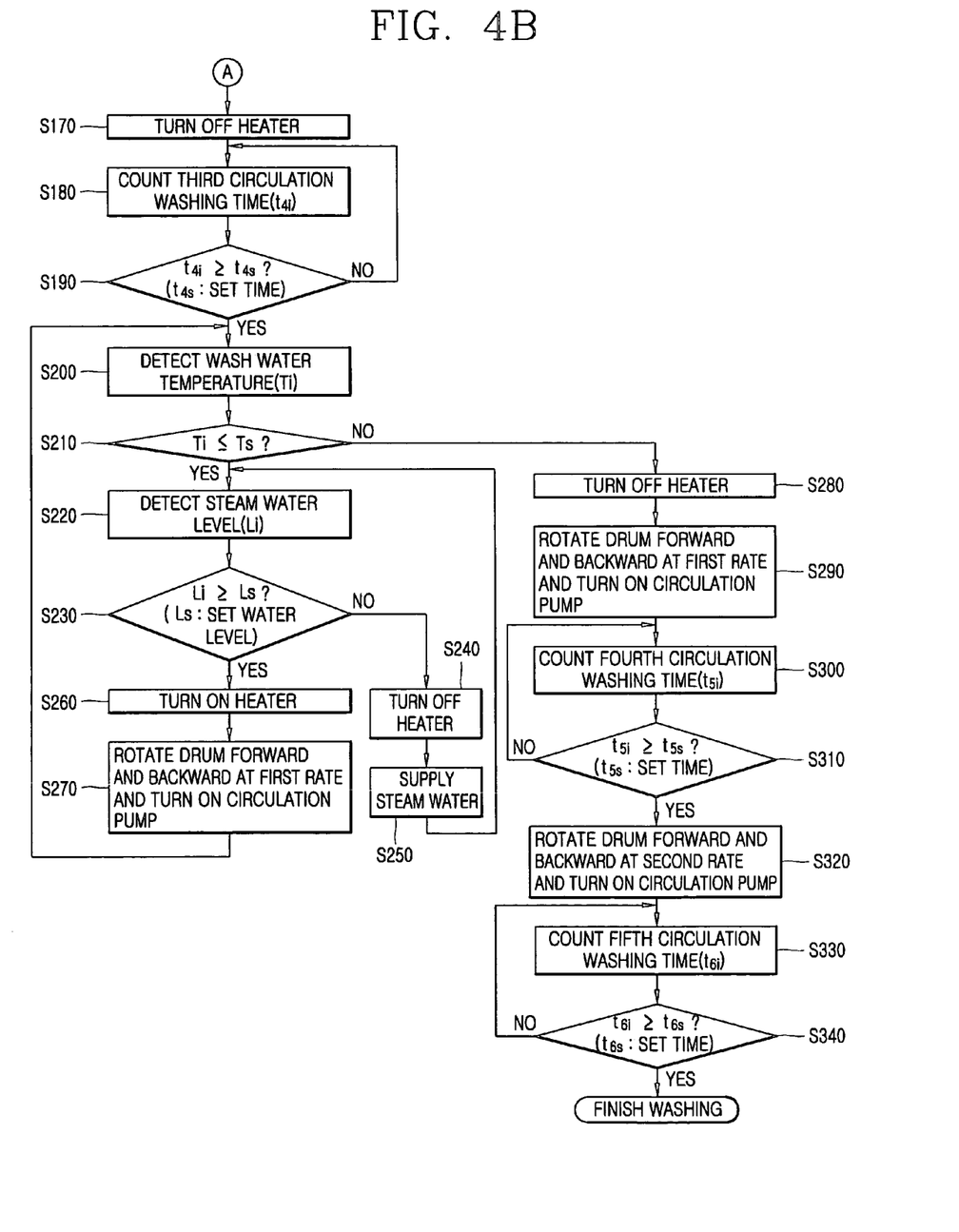

FIGS. 4A and 4B are flow charts for explaining the method of washing laundry in the drum washing machine according to the embodiment of the present invention.

When a washing course selected by a user begins, the control unit 290 controls the following components of the drum washing machine. First, the control unit 290 supplies wash water into the tub 110 at a preset water level by controlling the water supply valve 180 according to the amount of laundry, and finishes the water supply when the preset water level is detected by the water level sensor 300 (S10). When the water supply is finished, the control unit 290 circulates the wash water by rotating the drum 120 forward and backward at a first preset rate in a predetermined cycle by controlling the drum driving motor 190, drawing the wash water in the lower portion of the tub 110 by driving the circulation pump 280, and injecting the drawn wash water through the injector 260 (first circulation washing) (S20). Here, the first preset rate is a number of turns in a basic washing, for example, approximately 46 rpm.

When the first circulation washing is performed, the control unit 290 calculates the elapsed time (first circulation washing time ($t_{1i}$)) of the first circulation washing by the timer 310 (S30).

Next, if the first circulation washing time ($t_{1i}$) is less than the first preset time ($t_{1s}$), the control unit 290 continuously perform the first circulation washing, or if the first circulation washing time ($t_{1i}$) reaches the first preset time ($t_{1s}$), the control unit 290 rotates the drum 120 forward and backward intermittently at a second preset rate by controlling the drum driving motor 190 and simultaneously drawing wash water in the lower portion of the tub 110 by maintaining a driven state of the circulation pump 280, and circulates the wash water by injecting the drawn wash water by the injector 260 (second circulation washing) (S40→S50).

Preferably, the second preset rate is set higher (for example, approximately 150 rpm) than the first preset rate such that the laundry is dewatered and the content of wash water of the laundry is lowered, to thus increase the operation time of the circulation pump 280. As stated above, in a case where the second preset rate is higher than the first preset rate, the operation time of the circulation pump 280 may be increased, which enables it to constantly wet the laundry even with a small amount of wash water. Further, when circulating wash water while rotating the drum in every washing process below including the second circulation washing, it is preferable that the circulation pump 280 repeats the process of being turned on if the water level of wash water in the tub 110 is an operation water level enabling the driving of the circulation pump 290 and being turned off if the water level of the wash water is not the operation water level, in a repetitive fashion.

The control unit 290 calculates the elapsed time (second circulation washing time ($t_{2i}$)) of the second circulation washing by the timer 310 (S60).

Thereafter, if the second circulation washing time ($t_{2i}$) is less than the second preset time ($t_{2s}$), the control unit 290 continuously perform the second circulation washing, or if the first circulation washing time ($t_{2i}$) reaches the second preset time ($t_{2s}$), the control unit 290 stops the driving of the drum 120 and the circulation pump 280 so that the second circulation washing process may be finished (S70→S80).

Continually, the control unit 290 detects a steam water level ($L_i$) by the steam water level sensor 252 (S90).

If the detected water level ($L_i$) is less than a preset water level ($L_s$), steam water is supplied up to the preset water level ($L_s$) with the heater turned off (S100→S110→S120), or if the detected water level ($L_i$) is greater than the preset water level ($L_s$), the control unit 290 applies power to the heater 253 to generate steam, injects the generated steam into the drum 120, have the drum 120 rotated forward and backward at the first preset rate by controlling the drum driving motor 190, and simultaneously drives the circulation pump 280 so as to circulate the wash water, thereby washing the laundry (steam washing) (S100→S130→S140).

Next, the control unit 290 calculates the elapsed time (steam washing time ($t_{3i}$)) of the steam washing by the timer 310 (S150).

If the calculated steam washing time ($t_{3i}$) is less than a third preset time ($t_{3s}$), the washing process returns to the step (S90) of detecting a steam water level ($L_i$), or if the calculated steam washing time ($t_{3i}$) is greater than the third preset time ($t_{3s}$), the steam supply is stopped by turning off the heater 253, the wash water in the tub 110 is circulated by driving the circulation pump 280 simultaneously while rotating the drum 120 forward and backward at the first preset rate by controlling the drum driving motor 190 (third circulation washing), and the elapsed time (third circulation washing time ($t_{4i}$) of the third circulation washing is calculated by the timer 310 (S170→S180→S190).

Thereafter, the control unit 290 performs the third circulation washing for a fourth preset time ($t_{4s}$), and when the third circulation washing time ($t_{4i}$) is finished, the control unit 290 detects the temperature ($T_i$) of the wash water in the tub 110 through the temperature sensor 320 (S200).

If the detected temperature ($T_i$) of the wash water is lower than the preset temperature ($T_s$), the control unit 290 detects a steam water level ($L_i$) by the steam water level sensor 252, and compares the detected steam water level ($L_i$) with the preset water level ($L_s$) (S210→S220→S230).

As a result of the comparison of the steam water level, if the detected steam water level ($L_i$) is lower than the present water level ($L_s$), water for steam generation is supplied with the heater 253 being turned off, and the washing process is returned to the step (S220) of detecting a steam water level ($L_i$) (S230→S240→S250). However, if the detected steam water level ($L_i$) is higher than the preset water level ($L_s$), the control unit 290 applies power to the heater 253 to generate steam, and circulates the wash water by controlling the circulation pump 280 simultaneously while rotating the drum 120 forward and backward at the first preset rate by controlling the drum driving motor 190 (S230→S260→S270). Thereafter, the washing process is returned to the step (i.e. S200) of detecting a wash water temperature ($T_i$).

When the detected temperature of the wash water reaches the preset temperature ($T_s$), the control unit 290 finishes the steam washing by turning off the heater 253, and carries out the circulation washing by circulating the wash water by driving the circulation pump 280 simultaneously while rotating the drum 120 forward and backward at the first preset rate (fourth circulation washing) (S210→S280→S290).

Next, the control unit 290 calculates the elapsed time (steam washing time ($t_{5i}$)) of the fourth circulation washing by the timer 310. When the calculated fourth circulation washing time ($T_{5i}$) reaches a fifth preset time ($T_{5s}$), the drum driving motor 190 and the circulation pump 280 are controlled, and thereby the drum 120 is driven for forward and backward rotation at the second preset rate, and the circulation pump 280 is continuously driven to circulate the wash water (fifth circulation washing) (S300→S310→S320).

When a fifth circulation washing time ($t_{6i}$) driven at the second preset rate is calculated, and the calculated fifth circulation washing time ($t_{6i}$) reaches a sixth preset time ($t_{6s}$), the driving of the drum 120 and of the circulation pump 280 is stopped to finish the overall washing process (S330→S340).

As described above, the method of washing laundry in the drum washing machine according to the present invention can decrease water consumption when doing washing by enabling washing even with a small amount of wash water and can reduce the amount of power use in a washing process by generating steam and heating the wash water and laundry, by comprising the steps of: supplying wash water to a tub of the drum washing machine up to a preset water level; washing laundry while circulating the wash water along a circulation channel formed to circulate the wash water of the drum washing machine simultaneously while rotating a drum forward and backward by operating a drum driving motor of the drum washing machine; and washing the laundry while circulating the wash water along the circulation channel simultaneously while generating steam in a steam generator, injecting the generated steam into .the drum and rotating the drum forward and backward As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of washing laundry in a drum washing machine including a tub to hold water, a drum rotatably placed inside the tub, a steam generator to generate steam, and a circulation pump to draw the water inside the tub and supply the drawn water to the tub, the method comprising steps of:

supplying water to the tub up to a first preset water level;

washing laundry in the drum by rotating the drum forward and backward while drawing the water inside the tub and supplying the drawn water to the tub; and injecting steam into the tub and drawing the water inside the tub and supplying the drawn water to the tub, while rotating the drum forward and backward, wherein the injecting of steam includes:

rotating the drum forward and backward at a preset rate and drawing the water inside the tub and supplying the drawn water to the tub, while generating steam and injecting the generated steam into the tub for a first preset time; and stopping steam generation after the first preset time, rotating the drum forward and backward at the preset rate for a second preset time, and re-drawing the water inside the tub and re-supplying the re-drawn water to the tub.

2. The method of claim 1, wherein the step of washing laundry in the drum by rotating the drum forward and backward while drawing the water inside the tub and supplying the drawn water to the tub comprises steps of:

drawing the water inside the tub and supplying the drawn water to the tub simultaneously while washing the laundry by rotating the drum forward and backward at a first preset rate for a first preset time; and re-drawing the water and re-supplying the re-drawn water to the tub simultaneously while washing the laundry by rotating the drum forward and backward at a second preset rate for a second preset time.

3. The method of claim 2, wherein the second preset rate is higher than the first preset rate.

4. The method of claim 2, wherein in the step of redrawing the water and re-supplying the re-drawn water to the tub, if a water level inside the tub reaches a second preset water level, the water is drawn and supplied to the tub, or if the water level does not reach the second preset water level, the water is not drawn.

5. The method of claim 1, wherein during the forward and backward rotation of the drum, if a water level inside the tub reaches a third preset water level, the water is drawn and supplied to the tub, or if the water level does not reach the third preset water level, the water is not drawn.

6. The method of claim 1, wherein the step of injecting steam into the tub and drawing the water inside the tub and supplying the drawn water to the tub while rotating the drum forward and backward comprises steps of:

(a) rotating the drum forward and backward at a preset rate, drawing the water and supplying the drawn water to the tub while generating steam and injecting the generated steam into the tub for a first preset time;

(b) stopping steam generation after the first preset time, rotating the drum forward and backward at the preset rate for a second preset time, re-drawing the water and re-supplying the re-drawn water to the tub;

(c) repeating the procedure of rotating the drum forward and backward at the preset rate while, until a temperature inside the tub reaches a preset temperature, generating steam and injecting the generated steam into the tub, and drawing the water and supplying the drawn water to the tub; and (d) stopping steam generation when the temperature reaches the preset temperature, rotating the drum forward and backward at the preset rate for a third preset time, drawing the water and supplying the drawn water to the tub.

7. The method of claim 6, wherein in the step (a) or step (b), if a water level inside the tub reaches a third preset water level, the water is drawn and supplied to the tub, or if the water level does not reach the third preset water level, the water is not drawn.

8. A method of washing laundry in a drum washing machine, the drum washing machine comprising a tub, a drum rotatably disposed in the tub, a circulation channel formed to circulate water in the tub and supply the same to laundry, a circulation pump for drawing the water and circulating the drawn water along the circulation channel, and a steam generator connected to a steam water supply valve to receive water for generating steam and injecting the generated steam into the tub, the method comprising steps of:

(a) supplying water to the tub up to a first preset water level;

(b) washing laundry while circulating the water along the circulation channel by operating the circulation pump and rotating the drum forward and backward;

(c) washing the laundry while generating steam through the steam generator which heats water supplied through the steam water supply valve, injecting the generated steam into the tub and rotating the drum forward and backward, and circulating the water along the circulation channel; and (d) washing the laundry while circulating the water inside the tub along the circulation channel.

9. The method of claim 8, wherein the step (b) comprises steps of:

(b1) washing the laundry while circulating the water along the circulation channel while rotating the drum forward and backward at a first preset rate for a first preset time; and (b2) washing the laundry while circulating the water along the circulation channel while rotating the drum forward and backward at a second preset rate for a second preset time.

10. The method of claim 9, wherein in the step (b2), during the forward and backward rotation of the drum, if a water level in the tub reaches a second preset water level, the circulation pump is operated to circulate the water, or if the water level does not reach the second preset water level, the circulation pump is not operated.

11. The method of claim 9, wherein the second preset rate is higher than the first preset rate.

12. The method of claim 8, wherein the step (c) comprises steps of:

(c1) supplying water to the steam generator up to a second preset water level, generating steam for a first preset time by operating a heater of the steam generator, injecting the generated steam into the tub, rotating the drum forward and backward at a preset rate, and washing the laundry while circulating the water by operating the circulation pump; and (c2) stopping the operation of the heater of the steam generator after the first preset time, rotating the drum forward and backward at the preset rate for a second preset time, and circulating the water by operating the circulation pump.

13. The method of claim 12, wherein during the rotation of the drum, if a water level in the tub reaches a third preset water level, the circulation pump is operated to circulate the water, or if the water level does not reach the third preset water level, the circulation pump is not operated.

14. The method of claim 8, wherein the step (c) comprises steps of:

(c1) washing the laundry while supplying water to the steam generator up to a second preset water level, generating steam for a first preset time by operating a heater of the steam generator, injecting the generated steam into the tub, rotating the drum forward and backward at a preset rate, and circulating the water by operating the circulation pump;

(c2) washing the laundry while stopping the operation of the heater after the first preset time, rotating the drum forward and backward at the preset rate for a second preset time, and circulating the water by operating the circulation pump;

(c3) washing the laundry while supplying water to the steam generator up to the second preset water level, generating steam by operating the heater, injecting the generated steam into the drum, rotating the drum forward and backward at the preset rate, and circulating the water by operating the circulation pump, until a temperature inside the tub reaches a preset temperature; and (c4) washing the laundry while stopping the operation of the heater, rotating the drum forward and backward at the preset rate for a third preset time, and circulating the water by operating the circulation pump, until a temperature inside the tub reaches a preset temperature.

15. The method of claim 14, wherein in the step (c1) or step (c2), during the forward and backward rotation of the drum, if a water level in the tub reaches a third preset water level, the circulation pump is operated to circulate the water, or if the water level does not reach the third preset water level, the circulation pump is not operated.

16. A method of washing laundry in a drum washing machine including a tub to hold water, a drum rotatably placed inside the tub, a steam generator connected to a steam water supply valve to receive water for generating steam and injecting the generated steam into the tub, a circulation channel formed to circulate water in the tub and supply the same to laundry, and a circulation pump to draw the water inside the tub and supply the drawn water to the tub, the method comprises:

a steam washing step for washing the laundry by water and steam, the steam washing step including:
  a steam injecting step for injecting steam into the tub by operating the steam generator which heats water supplied through the steam water supply valve;
  a drum rotation step for rotating the drum, the steam injecting step and the drum rotation step being simultaneously performed; and
  a circulation step for circulating the water in the tub through the circulation pump and the circulation channel.

17. The method of claim 16, wherein the steam washing step is performed based on a temperature in the tub.

18. The method of claim 16, wherein the steam washing step is performed based on a preset time.

19. The method of claim 16, further comprising a washing step for washing the laundry by the water, the washing step being performed at least one of before the steam washing step and after the steam washing step.

20. The method of claim 19, wherein the washing step is performed by rotating the drum and circulating the water in the tub.

21. The method of claim 20, wherein the washing step comprises a first circulation washing step and a second circulation washing step.

22. The method of claim 21, wherein the drum is rotated at a first preset rate in the first circulation washing step and the drum is rotated at a second preset rate in the second circulation washing step.

23. The method of claim 22, wherein the second preset rate is higher than the first preset rate.

24. The method of claim 21, wherein the first circulation washing step and the second circulation washing step are performed based on a preset time.

25. The method of claim 19, wherein the steam washing step and the washing step are alternatively performed.

26. A method of washing laundry in a drum washing machine, the drum washing machine comprising a tub, a drum rotatably disposed in the tub, a circulation channel formed to circulate water in the tub and supply the same to laundry, a circulation pump for drawing the water and circulating the drawn water along the circulation channel, and a steam generator for generating steam and injecting the generated steam into the tub, the method comprising:

(a) supplying water to the tub up to a first preset water level;
(b) circulating the water along the circulation channel by operating the circulation pump while rotating the drum; and
(c) generating steam in the steam generator and injecting the generated steam into the tub, while rotating the drum and circulating the water along the circulation channel by operating the circulation pump, wherein the step (c) comprises a drum rotation step for rotating the drum at a preset rate and circulating the water inside the tub, while generating steam and injecting the generated steam into the tub for a first preset time; and stopping steam generation after the first preset time, rotating the drum at the preset rate for a second preset time, and re-circulating the water inside the tub.

* * * * *